Sept. 16, 1930.  J. C. BLACK  1,776,061
FRACTIONATING TOWER
Filed Nov. 10, 1926    2 Sheets-Sheet 2

INVENTOR
John C. Black
BY
ATTORNEY

Patented Sept. 16, 1930

1,776,061

UNITED STATES PATENT OFFICE

JOHN C. BLACK, OF DESTREHAN, LOUISIANA

FRACTIONATING TOWER

Application filed November 10, 1926. Serial No. 147,554.

This invention relates to a process and an apparatus for fractionating liquids, particularly to the fractionation of oil, and which may be advantageously employed for the fractionation of cracked oil.

It is an object of this invention to devise an efficient fractionating equipment.

Figure 1:
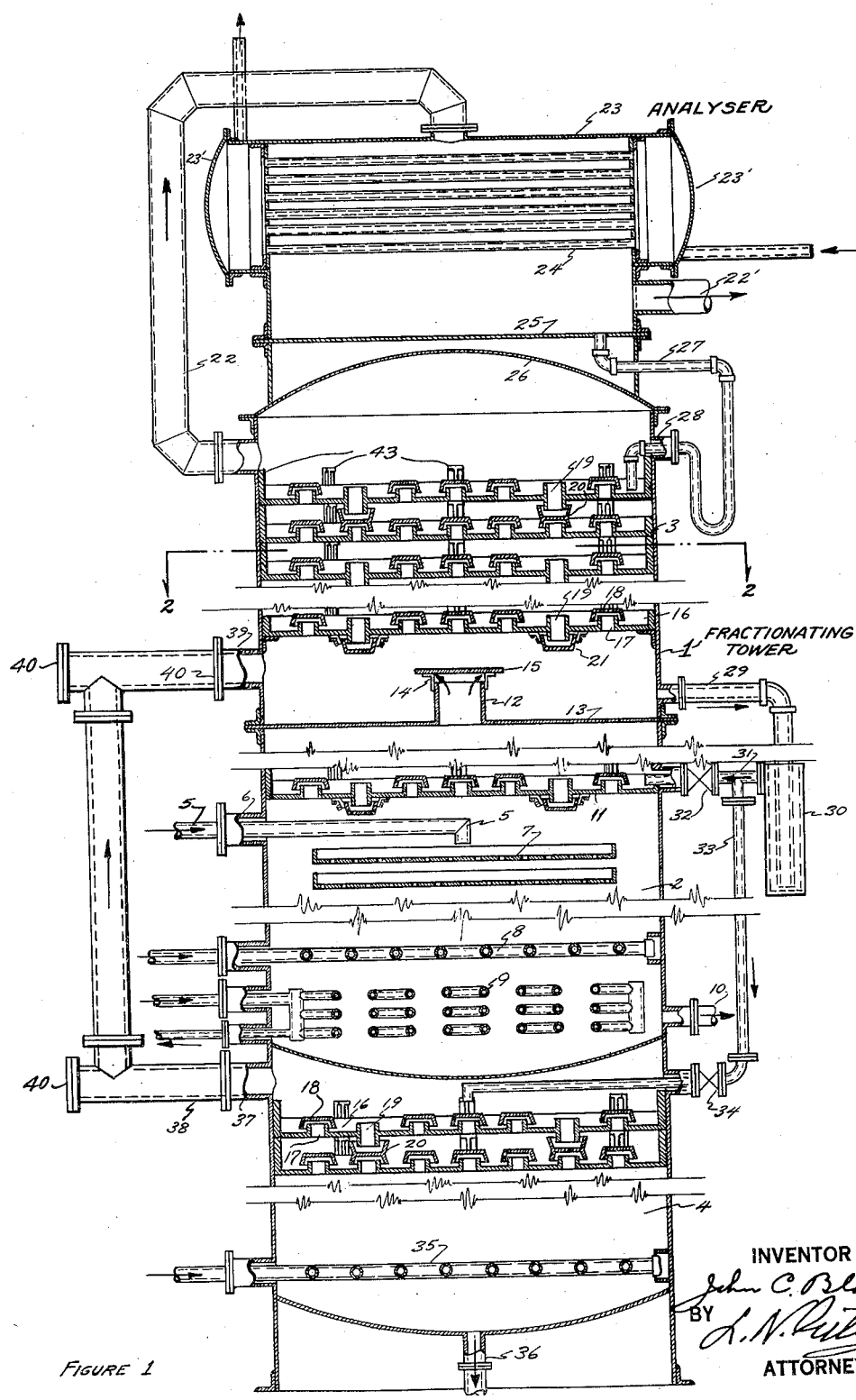
Figure 2:
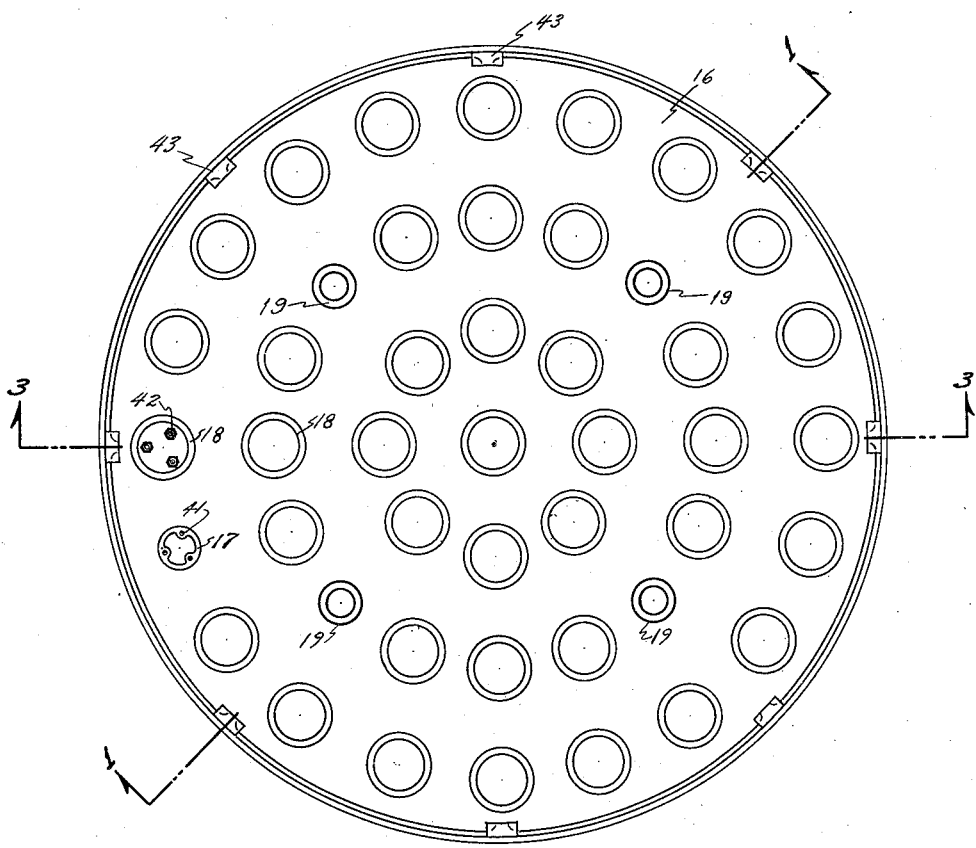
Figure 3:
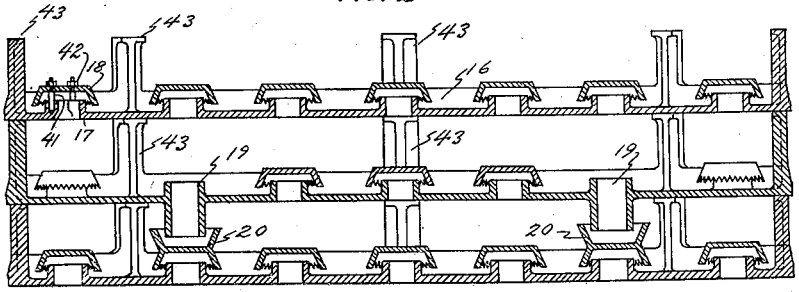

The invention will be more particularly understood with reference to the accompanying drawing, of which Figure 1 shows a part vertical sectional view of the apparatus, and Figure 2 is a plan view of the bubble trays taken on section line 2—2 Figure 1. Figure 1 is taken on section 1—1 of Figure 2. Figure 3 shows the assembly of a number of trays and is taken on section 3—3 of Figure 2.

In Figure 1, 1 is a fractionating tower, 2 is the evaporator section of the tower. 3 is the rectifying or bubble section of the tower. 4 is the reboiling section of the tower. 5 is an inlet for hot oil. This inlet passes through a tower connection 6 and is properly sealed. 7 are perforated distributing and vaporizing trays in the tower below the inlet 5. 8 and 9 are steam coils in the evaporator section of the tower. 10 is a residuum draw. 11 is a bubble tray, while only one is shown, the number may be increased as those skilled in the art will understand. 12 is a vapor outlet from the evaporator section. 13 is a plate separating the bubble section 3 from the evaporator section 2. Over the vapor outlet 13 is a cover plate 15, supported on brackets 14 attached to the vapor outlet 12. 16 is a bubble tray. All of the bubble trays in the tower, as shown, have similar construction. Bubble tray comprises a vapor passage 17 covered by a cap 18, and a liquid return pipe 19. The liquid return pipe on the bottom tray is sealed by a sealing cup 21 connected by straps to the bottom of the plate 16. In the upper plates the liquid return pipes are sealed by a cup made integral with the bubble cap 20, which covers the vapor passage immediately below the liquid return pipe 19. 22 is a vapor outlet from the top of bubble section 3. The vapor line 22 connects to the top of the analyzer 23. The analyzer is formed of a plurality of cooling pipes 24 connected to headers 23'. The analyzer is separated from the dishhead 26 of the section 3 by a plate 25. Plate 25 is spaced from the dish head 26 in order to provide an air space between the analyzer and the vapor tower. This provides an insulation between the two. In the bottom of the chamber formed by the plate 25 is a vapor outlet 22'. Connecting the analyzer and the upper plate of the section 3 is a liquid return line 27. This line passes through a tower connection 28 suitably sealed. 29 is a condensate line connecting to the bottom of the bubble section 3. 30 is a liquid seal for this line. 31, in which there is a valve 32, is a line connecting the liquid seal 30 with the plate 11. 33 is a line connecting the liquid seal 30 with the plates of the reboiler section 4. 34 is a valve in said line. 35 is a steam coil in section 4. 36 is a residue draw off from the bottom of the reboiler section 4. 37 is a tower connection connecting the upper part of the reboiler section with the vapor line 38. 39 is a tower connection placed immediately below the last plate in section 3. 40 is a cover plate for this connection.

Figures 2 and 3 show details of the construction of the plates. The vapor passage 17 is formed with three studs, 41. The bubble cap 18 is affixed to the studs by bolts 42, and rest on shoulders formed on the studs. For simplicity the construction of the method of support for the caps is shown, but on two vapor passages and caps all the caps are similarly supported. There is a cap on each vapor passage. The plates are so formed as to have legs 43. These legs act as supports for the upper trays. The plates as shown contain three rows of bubble caps and a centrally placed bubble cap. The number of bubble caps which will be required will depend upon the capacity of the tower and will be varied with the amount of vapor which must be refluxed, as those skilled in the art will understand.

In towers in which the vapor velocity is at all great, and in which there is considerable pressure, I find that the bubble caps must be held in place. Otherwise the pressure will lift the bubble caps from their place and destroy the effectiveness of the tower. The method of affixing the bubble caps as described above, I find to be very effective and economical. The use of a three point support of the character shown allows the adjustment of the cap to insure uniform distribution of vapor across the whole periphery of the cap. It also allows for the adjustment of all the caps to insure a uniform distribution of vapor across the plate. The cap is adjustable vertically by adjusting the studs upward or downward in the tapped holes in the vapor passage 17, or by use of washers under the cap. It may be adjusted in the plane of the cap by separately adjusting each stud.

The sealing of the liquid return pipes by forming the seal as part of the bubble caps, gives an economical and very effective construction. The seal is, in fact, two bubble caps inverted one upon the other, or can be made as an integral unit.

The analyzer is connected to the bubble section so that the vapors pass downward through the analyzer, with the inlet to the analyzer being made at the top thereof. Were the vapor inlet connection to the analyzer be made at the bottom thereof, the liquid condensate would tend to be held in the analyzer by the pressure of the vapors, thus reducing the effectiveness of the analyzer. By connecting the vapor inlet to the analyzer, to the top of the analyzer, and removing the condensate through line 27 and the vapors through line 22', the pressure of the vapor aids in removing the condensate from around the cooling tubes and so increases the effectiveness of the analyzer. The bubble section 3 has a vapor connection 39 for admitting vapors which are to be refluxed together with the vapors rising out of 12, as, for instance, vapors issuing from line 38. The positioning of plates 11 in evaporator 2 increases the efficiency of bubble section 3. The construction of these plates is identical to plates 16. Vapors rising in 2 carry considerable entrained liquid which would collect on plate 13 contaminating the condensate. Plates 11 of which there may be a plurality act to scrub this vapor and remove entrained condensate. The action of the plate is aided by returning some condensate from the bubble section 3 via lines 29 and 31. Condensate collected in bubble section 3 is returned via line 33 and valve 34 to plates 16 of reboiler section 4. Here they are distilled by aid of steam, if desired, through pipe 35 or by additional heat, such heat being from exchange with the residuum issuing from 10, or by fire, and the vapors removed through 38 and the unvaporized residuum through 36. By placing all of the sections in one tower considerable economy is obtained in construction costs, since only one foundation is needed.

The operation of this tower when oil is being distilled is as follows:

Heated oil is introduced through pipe 5 spread over plates 7 where vaporization occurs. The unvaporized material falls down into the bottom of section 2 and its distillation is aided by steam through 8 and 9. The vapors generated in section 2 are scrubbed by plates 11 with the aid of condensate introduced through 31. The vapors rising through 12 are fractionated in section 3 with the aid of the reflux formed by the condensation of the vapors in analyzer 23. This condensate is returned through connection 27. Uncondensed vapors leave 22' to the final condenser. The condensate formed in 3 is withdrawn through 29 and redistilled by passing it over plates 16 in section 4. This distillation is aided by steam through 35. Vapors leaving through 38 may be condensed separately or may be returned to the bubble section 3 via tower connection 39.

In operating a cracked oil such as cracked fuel or gas oils the cracked oil is introduced through 5. The condensate collecting in section 2 is a gas oil. This gas oil fraction is contaminated with considerable portion of gasoline hydrocarbons. By passing them over plates 16 in section 4 this condensate is stripped of the gasoline hydrocarbons and the stripped gas oil is withdrawn through connection 36. The gasoline hydrocarbons removed through 38 consist of some light gasoline hydrocarbons, but contains a considerable preponderance of heavy gasoline hydrocarbons. These may be separately condensed or may be returned to section 3 to be refractionated together with vapor issuing through 12. This may be done if considerable steam is not employed in section 4. If too much steam is employed in 4 the steam may interfere with the fractionation in section 3. When the oil coming through 33 is separately heated, such as by heat exchange with the residuum from 10 or by direct fire, little steam is required, and the vapors there generated then may be passed via 39 to 3. The vapors from 38 may be separately fractionated and the light gasoline hydrocarbons in vaporous form introduced into 3. In this case it may be preferable to place 39 further up in the tower. The liquid withdrawn through 36 is a gas oil stripped of the gasoline hydrocarbons. The residuum drawn from 10 is a cracked residuum which has the characteristics of fuel oil. As will be understood by those skilled the art, the trays or plates which act as liquid vapor contact means may have many different forms in the combination fractionating tower. I prefer, however to employ the form of plate here described and illustrated.

The above is not to be taken as limiting my invention, but merely as illustrative of the best manner of carrying out my invention, which I claim to be:

1. An apparatus for fractionating hydrocarbon oils, comprising, conduit means for introducing a heated hydrocarbon oil into an evaporating compartment, an evaporating compartment and means for removing the unvaporized residuum from said evaporating compartment; distributing trays in the evaporating compartment to spread the heated hydrocarbon oil, bubble trays, stationed above the distributing trays in said evaporating compartment to fractionate and separate any entrained residual oil from the vapors formed in the evaporating compartment; a fractionating compartment with fractionating means stationed above the said evaporating compartment and a liquid trap separating the evaporating compartment from the fractionating compartment with vapor inlet means from the evaporating compartment into the fractionating compartment; a distilling compartment below the fractionating compartment; conduit means with control valves and a liquid seal for introducing regulated supplies of condensate from the said liquid trap into the evaporating compartment and the distilling compartment; said distilling compartment provided with heating, fractionating and conduit means for removing unvaporized oil; a conduit for passing vapors from said distilling compartment into the lower section of the fractionating compartment; means for passing the vapors from the fractionating compartment into an analyzer; an analyzer with means for removing the fractionated vapors from the bottom of the analyzer, and means for returning the condensate formed in the analyzer into the fractionating compartment.

2. An apparatus for fractionating hydrocarbon oils, comprising, a compartment tower, an evaporating compartment, conduit means for introducing a heated hydrocarbon oil into the said evaporating compartment of the tower, distributing trays in the evaporating compartment of the tower to spread the heated hydrocarbon oil, fractionating means stationed above the distributing trays in the evaporating compartment and means for removing unvaporized oil from the bottom of the evaporating compartment; a fractionating compartment with fractionating means stationed above the said evaporating compartment and a liquid trap separating the evaporating compartment from the fractionating compartment with vapor inlet means from the evaporating compartment into the fractionating compartment; a distilling compartment below the fractionating compartment; conduit means for introducing regulated supplies of condensate from the said liquid trap into the evaporating compartment and the distilling compartment, said distilling compartment provided with steam heating means, fractionating means, and conduit means for removing unvaporized hydrocarbon oil; a conduit for passing vapors from said distilling compartment into the lower part of the fractionating compartment; means for passing the vapors from the fractionating compartment into an analyzer, an analyzer with cooling means to condense the higher boiling hydrocarbon oil vapors passing into the said analyzer and with means for removing the fractionated vapors from the bottom of the analyzer and means for returning the condensate formed in the analyzer into the fractionating compartment.

3. An apparatus for fractionating hydrocarbon oils, comprising, a compartment tower, an evaporating compartment, conduit means for introducing a heated hydrocarbon oil into the said evaporating compartment of the tower, distributing trays in the evaporating compartment of the tower to spread the heated hydrocarbon oil, fractionating means stationed above the distributing trays in the evaporating compartment and means for removing unvaporized oil from the bottom of the evaporating compartment; a fractionating compartment with fractionating means stationed above the said evaporating compartment and a liquid trap separating the evaporating compartment from the fractionating compartment with vapor inlet means from the evaporating compartment into the fractionating compartment; a distilling compartment below the fractionating compartment; conduit means for introducing regulated supplies of condensate from the said liquid trap into the evaporating compartment and the distilling compartment, said distilling compartment provided with steam heating means, fractionating means, and conduit means for removing unvaporized hydrocarbon oil; a conduit for passing vapors from said distilling compartment into the lower part of the fractionating compartment; means for passing the vapors from the fractionating compartment into an analyzer; an analyzer with means for removing the fractionated vapors from the bottom of the analyzer and means for returning the condensate formed in the analyzer into the fractionating compartment.

In testimony whereof I affix my signature.

JOHN C. BLACK.